Feb. 2, 1965  J. S. SWEARINGEN  3,167,928
METHOD OF AND APPARATUS FOR VENTING FIXED GAS FROM
ABSORPTION REFRIGERATION SYSTEM
Filed April 26, 1963  3 Sheets-Sheet 1
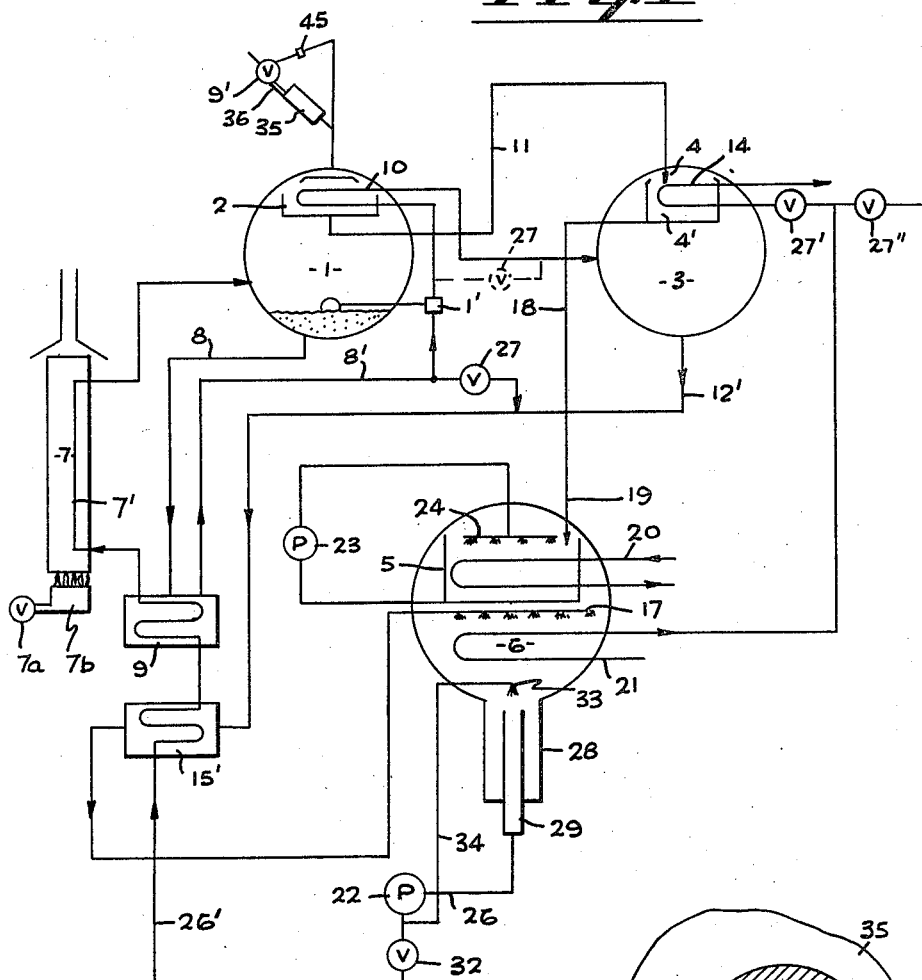
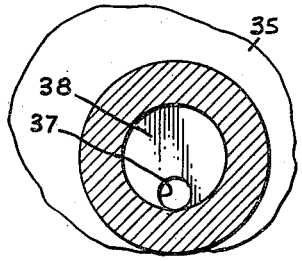
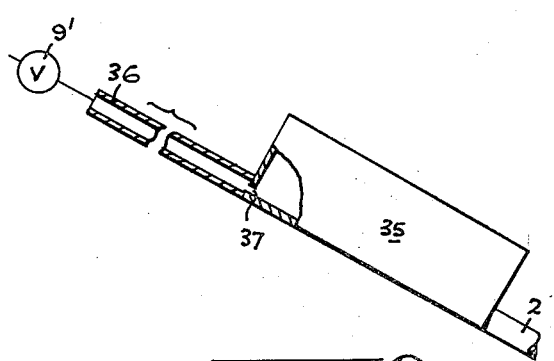
JUDSON S. SWEARINGEN
INVENTOR.
BY
ATTORNEY Feb. 2, 1965   J. S. SWEARINGEN   3,167,928
METHOD OF AND APPARATUS FOR VENTING FIXED GAS FROM
ABSORPTION REFRIGERATION SYSTEM
Filed April 26, 1963   3 Sheets-Sheet 2

JUDSON S. SWEARINGEN
INVENTOR.

BY
ATTORNEY

Feb. 2, 1965 J. S. SWEARINGEN 3,167,928
METHOD OF AND APPARATUS FOR VENTING FIXED GAS FROM
ABSORPTION REFRIGERATION SYSTEM
Filed April 26, 1963 3 Sheets-Sheet 3

JUDSON S. SWEARINGEN
INVENTOR.

BY

ATTORNEY

United States Patent Office 3,167,928
Patented Feb. 2, 1965

3,167,928
METHOD OF AND APPARATUS FOR VENTING FIXED GAS FROM ABSORPTION REFRIGERATION SYSTEM
Judson S. Swearingen, Los Angeles, Calif., assignor to Electronic Specialty Co., Los Angeles, Calif., a corporation of California
Filed Apr. 26, 1963, Ser. No. 275,843
22 Claims. (Cl. 62—85)

This invention relates to a method and devices for venting uncondensed gases from condensers in which vapor and uncondensed fixed gases are present at a pressure more elevated than the pressure of the ambient environment to which the gases are vented.

This application is a continuation-in-part of application Serial No. 157,170, filed December 5, 1961, application Serial No. 159,531, filed December 15, 1961, and application Serial No. 221,194, filed September 4, 1962.

As is well known in vapor condensation processes associated with evaporative or distillation operations, where fixed gases are present, it is necessary to vent the uncondensed fixed gases, for otherwise the efficiency of the condensation process is reduced.

One useful application of my invention is to vent fixed gas present in uncondensed water vapor, for example, such gases as air or hydrogen, which are present in the effluent from the condenser for condensing water vapor produced in a generator employed for concentrating a dilute salt solution circulated from the absorber of an absorption refrigeration system.

In such processes, refrigeration is obtained by evaporation of water in a refrigeration zone maintained at low pressure. This low pressure is established by absorption of the resultant water vapors, for example, in a salt solution in an absorption zone. The vapor pressure of the water in the absorbing liquid is sufficiently low to establish the desired low temperature in the refrigerant evaporation zone. The regeneration of the diluted absorbing liquid from the absorber is obtained by vaporizing the refrigerant from the absorbing liquid at a relatively higher pressure. The resultant water vapor is condensed in a condensation zone and returned to the refrigerant evaporation step in the refrigeration zone of the process.

The system may become contaminated by fixed gas which arises from chemical reactions as by corrosion by the salt solution employed in the system or from air leaks into the low-pressure zones of the apparatus. The accumulation of this fixed gas in the system, and particularly in the low-pressure zones, such as in the absorber, interferes with the efficiency of the process. A very small volume of fixed gas at ambient pressure, which is a much larger volume at the low pressure existing in the absorber, can materially interfere with the efficient operation of the absorbing stage.

The removal of fixed gas is of importance not only to obtain efficient operation of the process as described above, it is also highly beneficial in aiding in the rapid attainment of the required low temperatures when the system is first started or is re-started after a shutdown.

When the system is shut down, pressures in the various parts of the system equalize. Any substantial quantity of fixed gas which has accumulated in the refrigerant condensation zone or in any other zone in the system which is at a higher pressure than in the absorber, will enter the absorber, to add to any fixed gas in the absorber. Thus, when the process is restarted, there will be present in the absorber an unduly high volume of fixed gas. It will be necessary to remove this fixed gas from the absorber before the desired low temperature may be obtained in the refrigerant evaporator.

This invention relates to methods and apparatus for removal of this fixed gas. In order to vent the gases, I transport them to a zone of relatively high pressure where they may be segregated and periodically vented. A convenient place to vent the gases to the ambient environment, e.g., the atmosphere, is in the zone of regeneration. The absorbing liquid is heated in the regeneration zone to vaporize the refrigerant. The refrigerant is separated from the absorbing liquid at this relatively high pressure. For this purpose, I transport the fixed gas in the system, and particularly from the absorber, to the regeneration zone. The fixed gas and refrigerant are vaporized in the regeneration zone and are introduced into a condensation zone. The vapor is condensed to form the condensate. The uncondensed vapors and fixed gases are segregated and the fixed gases are vented.

In order to be sure that on venting the gases, for example, to atmosphere, that no air enters the system, I provide means for assuring that during the venting period the pressure in the venting zone is maintained at a superatmospheric pressure.

This invention is particularly directed, in its preferred form, to a process wherein the refrigerant is water and the absorbing liquid is a salt solution. In a preferred form, the concentration of the salt solution is by a staged vaporization procedure in a multiple-effect vaporizing process. In such process, the vaporization occurs in two or more stages, called "effects," at two or more different pressures. In each effect the liquid is heated and vaporized. The vapor is separated from the liquid in a separation zone, for example, in a two-effect vaporizing step. Liquid passing to the first-effect separation zone is heated and partially vaporized in a heater. The unvaporized liquid is separated from the generated vapor and liberated gases in the first effect separation zone at the aforesaid higher pressure. The partially concentrated salt solution is cooled and passed through coils to the lower pressure second-effect separating zone. Vapor from the first-effect separating zone is condensed by heat exchange through the coils. Heat is thus transferred to the circulating, partially concentrated salt solution, to supply heat to vaporize water during the passage of the salt solution to the lower pressure second-effect separation zone.

The pressure in the first-effect separation zone and in the first-effect condensation zone depends on the portion of the unvaporized salt solution passing through the coils. The pressure may be increased by by-passing a greater portion of the salt solution and thus passing a smaller portion through the coils, as will be described below.

The vapor separated in the second-effect separation zone is condensed in a second-effect condensation zone by a cooling liquid passing in heat exchange with the vapor in the second-effect condensation zone. Condensate from the first-effect condensation zone enters the second-effect condensation zone, where it is combined with condensate of vapor separated in the second-effect separator. The combined condensate stream is introduced into an evaporation zone at a still lower pressure and evaporated at such lower pressure by heat exchange with the fluid to be refrigerated. The low pressure in the last-mentioned evaporation zone is maintained by absorbing the resultant vapor in the concentrated salt solution in the absorption zone.

The vapor pressure of the salt solution in the absorption stage is maintained sufficiently low to establish the desired pressure in the absorbing zone, and therefore in the condensate-evaporation zone. This establishes the temperature of the water being evaporated at the desired refrigeration temperature.

Although by using lithium bromide solution as the above salt solution, and by the proper choice of metals, corrosion is largely suppressed, some reaction between the water and the metals may occur, to produce fixed gas such as hydrogen, which accumulates in the system. Additionally, some air may enter through leaks.

As stated above, and as will be more fully described below, in order to avoid difficulties stated above, it is desirable to discharge the fixed gas from the absorption zone. A suitable point for this discharge for the fixed gas is in the first-effect condensation zone. This zone is at the highest pressure level in the system. This is suitably so if the pressure in this stage is controlled to be above ambient pressure when the gases are vented from the system.

In order to transport this fixed gas from the absorption stage to the first-stage fractionation zone, means are provided for producing a mixture of the fixed gas together with the diluted absorption liquid from the low pressure absorption zone. The liquid and fixed gas are introduced into the first-effect heater and separation zone. The mixture of vapor and fixed gas from the first-effect separator are introduced into the first-effect condenser. The vapor is condensed and separated from fixed gas together with some uncondensed vapor at a pressure above ambient. The gases are discharged to ambient pressure substantially free of vapor.

As will be more fully described below, should the pressure in the first-effect separator and condensation zone be below ambient pressure, means are provided whereby the pressure is increased to above ambient pressure. However, since the temperature of the salt solution in the first-effect separator increases with increase in pressure, notwithstanding the low corrosive effect of lithium bromide, this increases the rate of corrosion. In the usual case, absorption refrigeration operations are designed for the maximum heat load to be removed from the fluid to be refrigerated. But in the normal operation, the load on the unit is but a fraction of the maximum load. Under such conditions, the first-effect need not operate at the higher pressures and temperatures which are required when the greater heat load is to be removed from the fluid to be refrigerated. Means are therefore provided for elevating the pressure in the first-effect to above ambient and to maintain the elevation in pressure during venting. I then discontinue the venting operation, and allow the temperature and pressure in the separator to fall. Since the gas accumulation is slow, I may space the periods during which gas discharge is effected over a prolonged period of time. The operations are at a relatively low temperature for most of the time. The period of time during which the first-effect separator operates at the more elevated temperature during the venting period is but a fraction of the total operating time of the unit.

This procedure minimizes corrosion and gas generation resulting from corrosion, and this also aids in limiting the period required for venting of gases.

To effect venting of gases with minimum loss of vapor, I arrange the vapor and gas discharge conduit from first-effect condenser so that heat is removed from the vapor and the vapor is condensed, leaving a fixed gas substantially free of vapor. When pressure in the condensing zone is above ambient, the flow of vapor and gas to the discharge opening sweeps the gas toward the vent, and through the vent valve when this valve is open to ambient pressure.

A space is provided as a holding zone between the discharge valve and the condenser. The fixed gas accumulates in the holding space from which the gases pass through the vent valve.

In order to insure that gases are discharged during the period when the pressure in the holding zone is above ambient pressure and insure that the vapors are not discharged, I provide a heatsink between the holding zone and the vent valve. I periodically close the vent valve so that no flow occurs through the holding zone. During the period that the vent valve is closed, if the pressure in the condensation zone is not sufficiently above ambient to permit a safe venting of the gases, I cause an increase in the pressure in the condensation zone and in the holding zone.

When the pressure has risen safely above the ambient pressure, the vent valve is opened, and the accumulated gases are vented. The following vapors are condensed by contact with the walls of the heatsink. The vent valve is opened for a period of time calculated to be sufficient to vent the gases but insufficient to permit the condensing water vapor from raising the temperature of the heatsink to the boiling point of water at the pressures in the heatsink. Thus, the vapor front is prevented from reaching the vent valve. The vent valve is then shut and the cycle is repeated.

By this procedure gases are removed without loss of water vapor. Such loss would cause a concentration of the circulating salt solution, and if allowed to progress, will cause a progressive lowering of the temperature in the refrigerant evaporator and possible freezing in the evaporator. Also, if allowed to progress, it would so concentrate the salt solution so as to create the danger of solidification of the salt.

Periodically I interrupt the venting process by maintaining the vent valve closed for a prolonged period of time. During this period, vapor and gases enter the holding zone. Vapor condenses and gases accumulate and eventually fill the holding zone. The venting cycle is then resumed.

This invention will be further described by reference to the drawings, of which—

FIGURE 1 is a schematic flow diagram of an absorption refrigeration operation to which my invention may be applied;

FIGURE 2 is an enlarged, somewhat schematic drawing, partly in section, of the holding zone and the vent valve;

FIGURE 3 is a section taken on line 3—3 of FIGURE 2;

Figure 4:
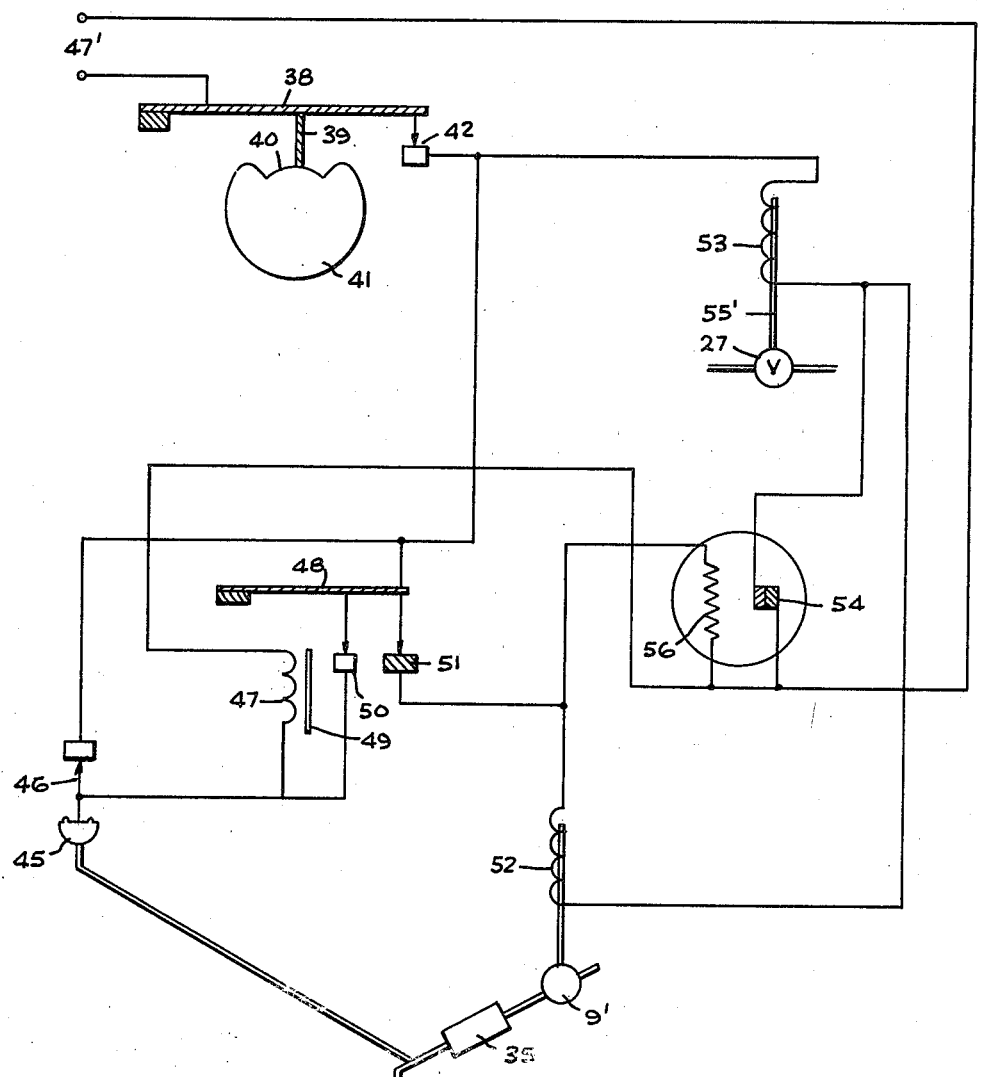
FIGURE 4 is an illustrative circuit diagram of the control mechanism.

In FIG. 1, the absorption liquid, which, for example, may be a salt solution, preferably a solution of lithium bromide in water carrying some fixed gas passing through passageways 7', is regenerated in a regeneration zone by being heated in heating zone 7 to the vaporization point and introduced into a separation zone 1, where the unvaporized concentrated lithium bromide solution is separated from the water vapor. The pressure in the separating zone may be any suitable pressure. This pressure may vary from about a third of an atmosphere to about one atmosphere absolute pressure, depending on the load, i.e., the amount of heat to be removed in the refrigerant evaporator and on the temperature of the cooling fluid passing through 21 and 14.

The water vapor containing fixed gas is passed to a condensing zone 2. The partially concentrated solution collecting in 1 is passed via line 8 and cooled by heat exchange in 9, in indirect heat exchange with the relatively cooler, dilute lithium bromide solution passing to the heating tubes 7' positioned in heater 7 fired by the gas burner 7b controlled by valve 7a. The partially concentrated solution is thus cooled to a lower temperature and is passed via line 8', under control of a float valve 1' via coil 10 in indirect heat exchange, in the condenser 2, with the water vapor and fixed gas separated in the aforementioned separating zone 1. The water condensate accumulates in the separating zone of the condenser 2.

A portion of the flow through line 8' may be bypassed via valve 27 directly into line 12' as described below. An alternative position for this by-pass valve is shown dotted in FIG. 1, whereby a portion of the partially concentrated salt solution may be by-passed around coil 10 and introduced directly into the separator 3.

Uncondensed gas substantially but not entirely free of water vapor passes through the air cooler 2' into a gas accumulation zone i.e., a holding zone 35 (see FIG. 2), to be described more fully below, and is discharged to ambient pressure through vent valve 9'.

The water condensate thus produced is passed from the condenser 2 through pipe 11 and is discharged into the second-effect condensation zone 4', operating at the lower pressure of zone 3. This is preferably at a low sub-atmospheric pressure. I may employ the method and devices for controlling the flow of liquid from 2 into 4' described in my copending application Serial No. 159,708 filed December 15, 1961, which is herewith incorporated by this reference.

The partially concentrated lithium bromide solution from 1, in passing through 10 (valve 27 being closed), is partially vaporized in 10 as it passes to the lower pressure separating zone 3. In the above case where the pressure in the separator 1 is between about one-third to one atmosphere, the pressure in the separator 3 may be of the order of about .3 to 1.5 pounds per square inch absolute, depending on the heat load and temperature of the cooling water as described below. In passing through 10, the salt solution abstracts heat from the vapor and gas in the condenser 2.

By opening valve 27 in either of the two alternative positions as described above, part of the circulating condensate from the separator 1 may be by-passed directly into line 12' or directly into 3. With less salt solution circulating through coil 10, the cooling effect in condenser 2 is reduced and the pressure and temperature in 2 increase.

Unvaporized concentrated solution and vapor generated in 10 are separated in 3. The vapor enters the condenser section 4', where it is commingled with the flashed condensate from 2. The combined water vapor is condensed in 4' by heat exchange with cooling liquid passing through coil 14.

The commingled water condensate from 4' then passes through line 18 and is introduced via pipe 19 into refrigerator evaporator 5, operating at a still lower pressure. The condensate from 19 passes in heat exchange with fluid in 20, for example, water, which is to be cooled in the refrigeration process. The unvaporized liquid in 5 is recirculated by pump 23 through spray 24. The water condensate is thus vaporized, and the fluid in 20 is cooled.

The concentrated solution in 3 is passed via line 12', heat exchanger 15', where it is cooled, and enters 6 via sprays 17. The water vapor from 5 is absorbed in 6, in the concentrated lithium bromide solution introduced via 17, cooled by cooling liquid passed through 21 in series with coil 14.

The vapor pressure of the absorbent liquid in the absorber 6 is lower than the vapor pressure of the liquid in 3, and establishes the pressure in the refrigerator evaporation zone 5. Thus, depending on the temperature of the cooling water, and therefore the temperature of the absorbing liquid and the salt concentration, the pressure may be of the order of a few millimeters of mercury absolute pressure and sufficient to establish the desired temperature of the water in contact with the coils 20. The diluted lithium bromide solution passing through line 29 is pumped by pump 22 and line 26 through heat exchangers 15' and 9 to the heater 7.

The process of my invention permits of the removal of this fixed gas and its discharge through valve 9', without material loss of water vapor, as will be more fully described below.

It is thus one of the advantages resulting from the use of my process that, because there is no substantial loss of water vapor, the safe concentrations in the various stages of the operation may be maintained substantially constant, and the operation may be thus made cyclic and continuous. Any substantial loss of water vapor in the vent gas as described above would result in a gradual concentration of the salt solution and thus cause an excessive concentration of salt, requiring periodic additions of water or adjustment of the temperature and pressure levels in the system.

In order to transport fixed gas from the absorber to the gas venting system, I may and preferably do, employ means to withdraw vapor and fixed gas from the absorber, along with the diluted salt solution in 6. Fixed gas in 6 unabsorbed in the salt solution is commingled with the liquid in 6 and conveyed, together with this liquid, through heater 7 and introduced into 1.

Figure 5:
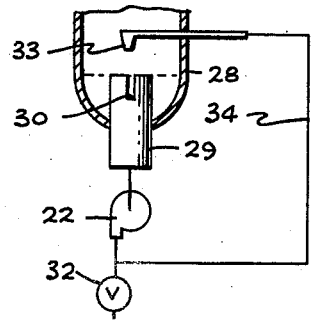
FIGURE 5 is a schematic showing of the gas transport system.

FIGURES 1 and 5 illustrate a means for this purpose, described and claimed in my co-pending application, Serial No. 157,170, filed December 5, 1961. The chamber 6 is provided with a sump 28 in which the diluted salt solution is accumulated. Mounted in the bottom of this sump is a vertical tube 29, slotted at the top at 30. A nozzle 33 is mounted so that it is in axial alignment with the tube 29. Tube 29 is connected to pump 22 by line 25. The output of the pump 22 is split by valves 32, the stream through 32 passes to heat exchanger 15' via line 26; and remainder of the stream from 32 enters the nozzles 33 via line 34. The jet stream from the nozzle falls inside tube 29. Liquid in the sump 28 also enters the tube through the slot 30.

The multiple, discontinuous streams of discrete liquid bodies in spray form from the nozzle 33 impinge on the surface of the moving column of liquid in tube 29 in a statistical manner, so as to form changing zones of turbulence across the surface of the liquid. The liquid forms pockets in which the gas and vapor are entrapped in the form of bubbles. The flowing liquid stream receives additional liquid from the sump through the slot 30.

The multiple streams of liquid coalesce into a gas-liquid body to form a coherent but heterogeneous mixture of gas and liquid in 29, where the liquid is the continuous phase and the gas is the dispersed phase.

The heterogeneous stream of liquid and gas falls through a head to the pump 22 at a velocity sufficient to overcome the separating tendency of the gas bubbles. As the liquid falls, the hydrostatic pressure on the bubbles increases. Substantially all of the vapor is absorbed, due to the increase in pressure, and the residual gas is compressed to form smaller bubbles. Due to the condensation of vapor and compression of the gas, the liquid-gas mixture is introduced into the pump 22 without substantial separation of gas from its dispersion in the liquid. The heterogeneous gas and liquid dispersion is thus a pumpable mixture and not a froth.

The fixed gas and diluted salt solution are then passed to the heater 7 and into the separator 1. By regulating the rate of recirculation of the liquid through 34 and 33, the rate of fixed gas removal from 6 may be made sufficiently great to permit of the maintenance of the desired low partial pressure of gas in the absorber 6. This is aided in a material sense because the volume of gas to be removed is minimized by the fact that it need be that which is currently generated in the system and which enters through leaks. As stated above, the gases are vented to atmosphere through the holding space the gas accumulation zone 35.

The holding space is a tubular chamber 35 connected to a tubular conduit 36 of extra heavy pipe. The tubular conduit is connected to the vent valve 9'. The port 37 at the entrance to the conduit 36 is formed in the baffle 38.

The length and the thickness of the tubular conduit 36 is such that giving effect to the specific heat of the metal (steel) of the wall of 36 are designed to cause condensation of entering water vapor during the time that the valve 9' is open. The valve 9' closes before the temperature of the tubular conduit reaches the boiling point of water. Any condensate formed in the tubular conduit drains back to the condenser.

The orifice 37 maintains a pressure drop between the condenser 2 and the conduit 36, when the valve 9' is open to ambient. This maintains a super-ambient pressure in the condensation zone. The orifice 37 is so positioned as to permit the condensate to drain back to the condensation zone.

The normal operating condition is with valve 9' closed and valve 27 closed. During this period, gas accumulates in the holding chamber 35.

The control circuit for operating the venting system is shown schematically in FIGURE 4. At the start of the cycle, with valve 9' and valve 27 closed, the rod 39 attached to the flexible arm 38 of the switch 42 enters the notch 40 of the cam disc 41 which is rotated by a clock mechanism. Such time-controlled switches are conventional and need not be further described. With the arm 38 in the position as illustrated, the switch 42 is closed and remains closed for the period of time, depending on the arcuate extension of the notch 40 and the speed of rotation of the disc 41. Assuming that the pressure in chamber 35 is below that desired to be present before valve 9' is opened, the pressure transducer 45 which is in the form of a pressure switch, connected to line 2', will not close the switch 46, and the circuit through coil 47 and switches 50, 51 and coil 56 is open. The circuit from the power input terminals 47', through 42, solenoid coil 53, and switch 54 is closed. Switch 54 is part of a time delay switch of conventional design, in which a current through a heating coil 56 heats an element which causes the switch 54 to open. When the current through heater coil 56 is interrupted at switch 51, as described below, switch 54 closes after a short period of time to permit cooling of 54. Switches of this character are well known and commercially available.

Switch 54 being closed, the solenoid coil 53 is energized, and the solenoid core opens the by-pass valve 27. The switch 46 being open, coil 47 and heating coil 56 are not energized, and the switches 50 and 51 open, as stated above; coil 52 is not energized, the valve 9' remains closed while valve 27 opens.

The opening of the by-pass valve 27 causes the pressure in the first-effect condenser to rise, as described above. When the pressure has risen to a safe, predetermined upper value, the pressure transducer operates to close switch 46.

The closing of the switch 46 completes the circuit in coil 47, and the core 49 pulls the spring arm 48 down to close the switches 50 and 51. This completes the circuit in solenoid coil 52 and heater 56. The solenoid coil 52 is energized and the solenoid armature opens valve 9'.

The switch 54 does not open until the heater coil 56 has been energized for a predetermined interval time, that is, until the temperature at the switch 54 has risen sufficiently to open the switch 54, whereupon the coil 53 is de-energized and the by-pass valve 27 is closed.

The above interval of time between the closing of the switch 46 and 51 to open valve 9' and the opening of the switch 54 to close the valves 9' and 27 permits the gas in the holding zone 35 to vent. The interval is, however, not long enough to permit the entry of vapor to fill the zone 36 and be discharged through valve 9'.

Before vapor can reach the valve 9' and be vented, the switch 42 opens, and the circuit is de-energized, and valves 9' and 27 close.

The closing of valve 27 passes the full flow of the salt solution from 1 through 10, causing the pressure in the first-effect condenser 2 to drop. When the pressure has dropped to a predetermined level, the pressure switch opens switch 46. The solenoid coil 47 is shorted by 50 as 48 is held down, notwithstanding the opening of switch 46. This keeps 51 closed, and 56 hot, and therefore 54 open and 27 closed, and 9' closed.

The cycle is thus ready to be repeated after a period of time determined by the timer motor and cam, as stated above. It will be seen that the temperature rise in the heater 7 and in the first-effect is thus limited to the interval of time during which the valve 27 is open. For most of the time, during which the arm 39 is out of the notch 40, the system operates at lower temperatures.

The pressure increase required to effect venting, in addition to or as an alternative of the by-passing of the circulating, partially concentrated salt solution passing to the second-effect separator, may be produced in the first-effect separator by the following procedures:

Instead of, or in addition to, the valve 27, I may add valves 27' at the input to the cooling coils. This is illustrated in FIGURE 1 when valves 27' and 27" is employed, valve 27 may or may not be employed. The closing of the valve 27' and opening of valve 27" causes an interruption of the flow of cooling fluid to condenser 4' and a rise in temperature in the second-effect condenser 4' and in the second-effect separator 3. This is reflected in a rise in a pressure in the coil 10 and a consequent rise in pressure in the first-effect separator. Thus, the closing of valve 27' and opening of valve 27" has an effect similar to the opening of the valve 27. Valves 27' and 27" may be operated by a solenoid such as 55 and when the solenoid is energized in the manner described in connection with FIGURE 4. Instead of two valves, single three-way valve may be employed for the same service.

Another way of causing variations in pressure in the separator 1 is to vary the heat input into the furnace by opening or closing at valve 7a (see FIG. 1) on the fuel flow line to the burner 7b of the gas-fired heater 7. This valve may be operated by a solenoid such as the solenoid 55 on valve 27. Thus, when the solenoid 55 is energized as described in connection with FIG. 4, it will open the valve 7a to increase the gas flow to the furnace to raise the temperature of the solution entering the separator and thus raise the pressure in the separator 1.

Figure 6:
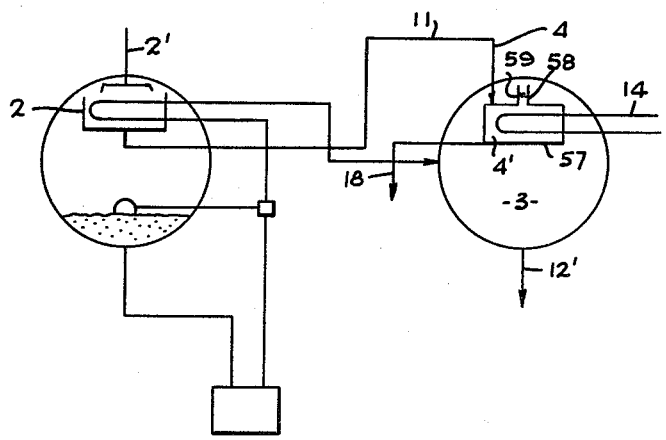
FIGURE 6 is a variation of the flow diagram of FIGURE 1.
Figure 7:
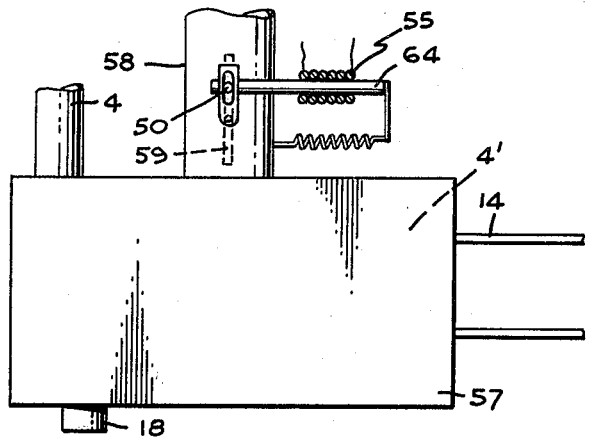
FIGURE 7 is a fragmentary detail of the system shown in FIGURE 6.

Another means of causing pressure variation in the separator 1 and in the condenser 2, is illustrated by FIGURE 6 which shows a fragment of the system as shown in FIGURE 1 in which valve 27 and its associated solenoid may or may not be employed. The variation in FIGURE 6 from FIGURE 1 is in the construction of the second-effect condenser 4'.

The condenser 4' is an enclosed box having vapor communication with a vapor space of the separator 3 through the vapor line 58 in which is positioned a throttle valve 59 mounted for rotation with a shaft 50 positioned for rotation in the line 58. The shaft is rotated by means of a lever 61 carrying a slot 62 in which is slidably mounted a pin 63 connected to the armature rod 64 actuated by the solenoid 55 and biased by the spring 59 connected at one end to the rod 64 and at the other end to the vapor line 58.

The closing of the throttle valve 59 will cause an increase in the pressure in the second-effect separator due to the throttling of the vapors passing from 3 through 58 to the condenser 4. This pressure is reflected in the first-effect condenser 2 and separator 1, causing an increase in the pressure therein. Since the back pressure against which the fluid discharges from 11 is the pressure in the condenser 4', the increase in the pressure in 4' results in an increase in the pressure in the condenser 2 and separator 1. Thus, the increase in pressure resulting from the closing of the valve 59 has the same effect as the opening of the valve 27.

The solenoid called 55 when energized closes the throttle valve 59, when energized in the manner described in connection with FIGURE 4. When the solenoid called 55 is de-energized as described above, the spring returns the valve to open position and the pressure in 4' and in 2 thus drops.

If only one of the controls described above is employed, then the solenoid of FIGURE 4 operates the selected valve. If all of the above controls are each controlled by a solenoid, then these solenoids are placed in parallel with the solenoid 55 as shown in FIGURE 4, as will be understood by those skilled in this art.

The periodic venting of the gas permits an extended period of time during which the vent valve is closed, and pressure need not be maintained in the separator above atmosphere, for example, at 16 pounds per square inch absolute as may be needed for venting the gases through valve 9'. At such times, the temperatures and pressures of the salt solution in the separator 1 are maintained at a much lower temperature than during the limited venting period. Thus, in the example given where the operation is at a fraction of the heat load for which the unit is designed, and the pressure in the separator 1 is below atmosphere. For example, should the pressure in the first-effect condenser be at about a third of an atmosphere, with a lithium bromide salt solution of concentration of about 58.5%, the temperature in the separator 1 will be at about 230° F. If the first-effect separator be at about 16 pounds absolute and the salt solution be of the same concentration, the temperature will be about 300° F. The corrosive effect of the salt solution in 1, is minimized by the low temperature in the separator made permissible by the periodic and limited period of venting as described in the process of my invention. For example, depending on the size of the unit, the venting period may last but a few minutes, while the interval of time between venting periods may be two or more hours.

It is to be noted that one of the large advantages of the period cycling of the venting process of my invention is that it permits a stabilized operation with minimized loss of vapor during venting; the removal of gases from the absorber where they may interfere with the absorption process; operation for a large fraction of the operating time at lower temperatures than is required for venting of gases with consequent inhibition of corrosion.

While I have described particular embodiments of my invention, it should be understood that various modifications and adaptations thereof may be made within the spirit of the invention, as set forth in the appended claims.

I claim:
1. A process for absorption refrigeration which comprises:
   (A) absorbing refrigerant vapors in an absorption liquid in an absorption zone;
   (B) removing absorption liquid containing refrigerant from said absorption zone;
   (C) heating the same to an elevated temperature in a regeneration zone and vaporizing refrigerant vapors at temperature and pressure more elevated than in the absorption zone;
   (D) separating vapors from the unvaporized absorption liquid and passing said vapors into a condensation zone and condensing the same in said condensation zone at substantially said pressure;
   (E) evaporating said condensed refrigerant vapors in an evaporation zone at a substantially lower pressure and temperature and passing vapors generated in the evaporation zone into the absorption zone;
   (F) introducing absorption liquid removed from said regeneration zone into said absorption zone and absorbing said vapors in said absorption liquid in said absorption zone;
   (G) separating fixed gases from said vapors in said condensation zone specified in (D);
   (H) passing vapors and gases from said condensation zone to a closed gas accumulation zone;
   (I) maintaining said gases in said accumulation zone, at a pressure higher than the pressure in the ambient space and periodically venting said gases to said space while maintaining said gases during said venting step at a pressure higher than in said space to which said gases are vented.

2. In the process of claim 1, and which said absorption liquid is an aqueous salt solution and said refrigerant is water.

3. In the process of claim 2, in which the pressure in said space to which said gases are vented is atmospheric and the pressure in said regeneration zone is below atmospheric, periodically prior to venting said gases, increasing the pressure in said regeneration zone to a pressure higher than atmospheric pressure and maintaining a pressure higher than atmospheric pressure during said venting step, interrupting said venting and then reducing the pressure in said condensing zone specified in (D) in claim 1.

4. In the process of claim 3, said increase in pressure being caused by increasing the temperature to which said salt solution is heated.

5. In the process of claim 3, in which said condensation specified in (D) of claim 1 is caused by passing a cooling liquid in heat exchange with said vapors in said condensing zone, said increase in pressure being caused by reducing the flow of cooling liquid in heat exchange with said vapors.

6. In the process of claim 2, passing water vapor into said gas accumulation zone, during said venting step, said gas accumulation discharging gases from said gas accumulation zone through a discharge passageway constituting a heatsink, condensing water in said heatsink and discharging gases substantially free of water vapor through said discharge passageway during said venting step, the heat of condensation of said water vapor raising the temperature of said heatsink and interrupting said venting of said gases before said heatsink reaches substantially 212° F., thus preventing any substantial discharge of water vapor with said vented gases.

7. In the process for refrigeration, which comprises:
   (A) heating an aqueous salt solution containing fixed gases to its vaporization point, at a relatively elevated temperature and pressure to produce a partially concentrated salt solution, water vapor and gas;
   (B) separating said water vapor and gas from said partially concentrated salt solution in a separating zone at said pressure;
   (C) withdrawing and cooling said partially concentrated salt solution;
   (D) condensing water vapor in a condensing zone in indirect heat exchange with said cooled, partially concentrated salt solution passing from said separating zone specified in (B) above;
   (E) withdrawing uncondensed gas and accumulating said fixed gases in a closed gas accumulation zone;
   (F) discharging said fixed gas from said zone of accumulation to ambient pressure and maintaining the pressure in said separating zone and in said gas accumulation zone above ambient pressure during said venting of gases;
   (G) partially vaporizing said salt solution during passage in said heat exchange referred to in (D) above, to form a further concentrated salt solution and water vapor at a lower pressure than in said separating zone referred to in (A) above, separating from said further concentrated salt solution at said lower pressure in a second separating zone, and withdrawing said water vapors and further concentrated salt solution from said second vaporizing zone;
   (H) condensing said last-named water vapor to form a condensate in a condensing zone at a lower pressure than in the separating zone referred to in (A) above;
   (I) introducing said last-named condensate into a refrigerant evaporation zone maintained at a pressure lower than in the lower pressure separating zone referred to in (G) above, and vaporizing said condensate in heat exchange with fluid to be refrigerated;
   (J) passing said last-named water vapor into an absorption zone and contacting said water vapor and fixed gases in said absorption zone with cooled concentrated salt solution in said absorption zone, thus establishing the low pressure and said refrigerant evaporation zone;

(K) withdrawing salt solution containing fixed gases from said absorption zone and heating the same as stated in (A) above, in cycles of operation;

(L) interrupting the discharge of gases specified in (F) above and reducing the pressure in said separating zone specified in (B) above and in said gas accumulation zone to less than that specified in (F) above.

8. In the process of claim 7, subsequent to interrupting said discharge of said gases to ambient pressure, and subsequent to reduction of pressure of said accumulated fixed gas referred to in (L) of said claim 7, increasing the pressure of said accumulated gases to a pressure above ambient after a period of time and again discharging said uncondensed gas to ambient pressure.

9. In the process of claim 8, in which said increase of pressure raises the temperature in said condensing zone specified in (D) of claim 7 to produce a super-atmospheric pressure in said condensing zone and separator.

10. In the process of claim 9, said step of raising the temperature in said condensing zone comprises by-passing salt solution passing from said separating zone specified in (B) of claim 7 into said absorber zone specified in (J) of claim 7, and thereby raising the temperature in said condensing zone.

11. In the process of claim 9, said step of raising the pressure in said condensing zone specified in (D) of claim 7, comprising raising the temperature to which the salt solution is heated, and thereby increasing the pressure in said condensing zone specified in (D) of claim 7, and in the gas accumulating zone specified in (D) of claim 7.

12. In the process of claim 9, the step of raising the pressure in the gas accumulation zone comprising raising the pressure in said second separating zone specified in (G) of claim 7, and thereby increasing the pressure in said gas accumulation zone specified in (E) of claim 7.

13. In the process of claim 9, passing cooling fluid in heat exchange with water vapors to condense the same as specified in (H) of claim 7, and raising the pressure in said second condensing zone by decreasing the amount of cooling fluid passing in heat exchange with said vapors.

14. In the process of claim 7, said step of withdrawing gas and accumulating said gas in a closed gas accumulation zone, at a pressure above ambient as specified in (E) of claim 6 above, including the step of passing said gases and vapor into an accumulation zone and from said accumulation zone into a passageway, having walls constituting a heatsink and separating and discharging gases from said gas accumulation zone through a discharged passageway, condensing water in said passageway, and discharging gases substantially free of water vapor from said discharge passageway, the heat of condensation of said water vapor raising the temperatures of the heatsink and interrupting the said discharges of gases before said heatsink reaches substantially 212° F. and thus preventing any substantial discharge of water vapor with said vented gases.

15. Absorption refrigeration apparatus comprising a heater, a heating passageway in said heater heated by said heater, a separator in fluid communication with said heating passageway, a condenser and vapor communication with said separator, an absorber, means to transfer liquid from said separator to said absorber, an evaporator means to transport condensate from said condenser to said evaporator, means to pass fluid to be refrigerated in heat exchange with liquid in said evaporator, and a vapor communication passageway between said absorber and said evaporator, a vapor and gas discharge chamber connected to said first-named condenser, a vent valve, a conduit connected to said chamber and said valve, the walls of said conduit constituting a heat mass sufficient to absorb latent heat of condensation of vapors passing from said condenser to said chamber, pressure sensitive means connected to said condensing zone and said chamber, and means operatively connected to said pressure sensitive means to open and close said valve responsive to said pressure.

16. In a multiple-effect absorption refrigeration apparatus comprising a first-effect separator, a first-effect condenser in vapor communication with said first-effect separator, a second-effect separator, second-effect condenser in vapor communication with said second-effect separator, an absorber, a refrigerant evaporator in vapor communication with said absorber, means to pass liquid from said absorber to the heater and from said heater to said first-effect separator, means to pass liquid from said first-effect separator in heat exchange with the vapor in said first-effect condenser and into said second-effect separator, means to pass condensate from said first-effect condenser and said second-effect condenser into said evaporator and means to pass liquid from said second-effect separator into said absorber, the improvement comprising a gas discharge conduit connected to said first-effect separator, a vent valve in said gas discharge line, a pressure sensitive means connected responsive to pressure in said first-effect condenser and operatively connected to said vent valve, and means to open and close said valve responsive to pressure levels in said first-effect condenser.

17. In the apparatus of claim 16, means to raise the pressure in said first-effect condenser above ambient pressure, said pressure sensitive means opening and holding said valve open while pressure is maintained at above ambient pressure and closing said valve after a predetermined interval of time while said pressure is above ambient pressure.

18. In the apparatus of claim 16, means to raise the pressure in said separator to a predetermined upper level at which said pressure sensitive means opens said valve.

19. In the apparatus of claim 18, said means to raise the pressure comprising a by-pass connection between said first-effect separator and said absorber, a valve in said by-pass and means operatively connected to said pressure sensitive means to open and close said valve in said by-pass.

20. In the apparatus of claim 18, said means to raise the pressure comprising cooling coils in heat exchange with the vapor in said second-effect condenser, and a valve in said coil and means operatively connected to said pressure sensitive means and to said valve to open and close said valve.

21. In the apparatus of claim 18, said means to raise the pressure comprising a gas-fired burner to heat said passageway in said heater, a gas line to said burner, a valve in said gas line, and means operatively connected to said valve and to said pressure sensitive means to open and close said valve.

22. In the apparatus of claim 18, said means to raise the pressure comprising an enclosed chamber for said second-effect condenser, a vapor communication pipe between said chamber and said second-effect separator, a throttle valve in said vapor pipe, and means operatively connected to said throttle valve and to said pressure sensitive means to open and close said throttle valve.

References Cited in the file of this patent
UNITED STATES PATENTS

| 2,344,245 | Grossman | Mar. 14, 1944 |
| 2,400,137 | Reid | May 14, 1946 |
| 2,400,138 | Buffington | May 14, 1946 |
| 2,450,707 | Zwickl | Oct. 5, 1948 |
| 2,755,635 | Bourne | July 24, 1956 |
| 2,986,905 | Kocher et al. | June 6, 1961 |
| 3,013,404 | Endress et al. | Dec. 19, 1961 |